(12) United States Patent
Surianarayanan

(10) Patent No.: US 11,853,565 B2
(45) Date of Patent: Dec. 26, 2023

(54) SUPPORT HIGHER NUMBER OF ACTIVE ZONES IN ZNS SSD

(71) Applicant: Western Digital Technologies, Inc., San Jose, CA (US)

(72) Inventor: Ravishankar Surianarayanan, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 7 days.

(21) Appl. No.: 17/492,224

(22) Filed: Oct. 1, 2021

(65) Prior Publication Data

US 2023/0103355 A1 Apr. 6, 2023

(51) Int. Cl.
*G06F 3/06* (2006.01)
(52) U.S. Cl.
CPC ............ *G06F 3/0631* (2013.01); *G06F 3/064* (2013.01); *G06F 3/0613* (2013.01); *G06F 3/0644* (2013.01); *G06F 3/0652* (2013.01); *G06F 3/0673* (2013.01)
(58) Field of Classification Search
CPC ...... G06F 3/0631; G06F 3/0613; G06F 3/064; G06F 3/0644; G06F 3/0652; G06F 3/0673
See application file for complete search history.

(56) References Cited

U.S. PATENT DOCUMENTS

| 7,437,517 | B2 * | 10/2008 | da Silva | G06F 12/08 710/5 |
| 8,266,354 | B2 | 9/2012 | Arhan et al. | |
| 9,830,079 | B2 | 11/2017 | Kanno | |
| 10,126,981 | B1 | 11/2018 | Malina et al. | |
| 10,338,841 | B2 * | 7/2019 | Kathawala | G06F 12/0246 |
| 10,606,516 | B2 | 3/2020 | Subraya | |
| 2011/0072194 | A1 * | 3/2011 | Forhan | G06F 12/0246 711/170 |
| 2011/0283287 | A1 * | 11/2011 | Ha | H04W 72/10 718/103 |
| 2019/0042150 | A1 * | 2/2019 | Wells | G06F 3/0659 |
| 2020/0012444 | A1 * | 1/2020 | Ko | G06F 3/0679 |
| 2021/0173588 | A1 | 6/2021 | Kannan et al. | |
| 2022/0261182 | A1 * | 8/2022 | Galenchik | G06F 3/0679 |

FOREIGN PATENT DOCUMENTS

CN 112148226 A 12/2020

OTHER PUBLICATIONS

International Search Report and Written Opinion for International Application No. PCT/US2022/028246 dated Sep. 15, 2022.

* cited by examiner

*Primary Examiner* — Zhuo H Li
(74) *Attorney, Agent, or Firm* — PATTERSON + SHERIDAN, LLP; Steven H. VerSteeg

(57) ABSTRACT

A data storage device includes a memory device and a controller coupled to the memory device. The controller is configured to allocate two or more zones to a first superblock of a plurality of superblocks. The controller is further configured to allocate a zone to a second superblock, where the second superblock only stores data of the zone. The first superblock has a first priority and the second superblock has a second priority, where the second priority is greater than the first priority. Data is moved from the first superblock to another superblock dedicated for a single zone after the first superblock is closed.

20 Claims, 8 Drawing Sheets

SUPPORT HIGHER NUMBER OF ACTIVE ZONES IN ZNS SSD

BACKGROUND OF THE DISCLOSURE

Field of the Disclosure

Embodiments of the present disclosure generally relate to data storage devices, such as solid state drives (SSDs), and, more specifically, allocating and assigning superblocks to zones.

Description of the Related Art

ZNS SSDs are a class of SSDs that supports either sequential only zones or zone random write area (ZRWA). In a sequential only zones ZNS SSD, zone data is written sequentially without overwrites. However, in a ZRWA ZNS SSD, zones are written to randomly and with overwrites. Typically, ZNS SSDs supports sequential only zones. In order to overwrite a sequential zone, the zone must be reset before writing to the zone again. A zone reset is an unmapping of all the data in the zone.

When a data storage device supports multiple active zones, each zone may be mapped to a superblock (i.e., a logical grouping of blocks across one or more dies of a memory device). Because each superblock allocated requires dedicated resources, such as exclusive or (XOR) parity contexts, write buffers, read buffers, and the like, to maintain a quality of service, the number of superblocks or zones that can be opened simultaneously may be limited. In some examples, ZNS SSDs may have enough system resources available to about 12 active zones.

Therefore, there is a need in the art for an improved data storage device that can support a larger number of active zones without increasing system resources.

SUMMARY OF THE DISCLOSURE

The present disclosure generally relates to data storage devices, such as solid state drives (SSDs), and, more specifically, allocating and assigning superblocks to zones. A data storage device includes a memory device and a controller coupled to the memory device. The controller is configured to allocate two or more zones to a first superblock of a plurality of superblocks. The controller is further configured to allocate a zone to a second superblock, where the second superblock only stores data of the zone. The first superblock has a first priority and the second superblock has a second priority, where the second priority is greater than the first priority. Data is moved from the first superblock to another superblock dedicated for a single zone after the first superblock is closed.

In one embodiment, a data storage device includes a memory device having a plurality of superblocks and a controller coupled to the memory device. The controller is configured to allocate two or more zones to a first superblock of the plurality of superblocks.

In another embodiment, a data storage device includes a memory device having a plurality of superblocks and a controller coupled to the memory device. The controller is configured to receive a first command to open a first zone or allocate first data to the first zone, allocate a first superblock of the plurality of superblocks to the first zone, the first superblock configured to store data of more than one zone, receive a second command to open a second zone or allocate second data to the second zone, and either allocate the first superblock to the second zone or allocate a second superblock to the second zone. The second superblock consists of a single zone.

In another embodiment, a data storage device includes memory means having a plurality of superblocks and a controller coupled to the memory means. The controller is configured to allocate a first one or more superblocks to store one zone per superblock and allocate a second one or more superblocks to store more than one zone per superblock.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, allocating and assigning superblocks to zones. A data storage device includes a memory device and a controller coupled to the memory device. The controller is configured to allocate two or more zones to a first superblock of a plurality of superblocks. The controller is further configured to allocate a zone to a second superblock, where the second superblock only stores data of the zone. The first superblock has a first priority and the second superblock has a second priority, where the second priority is greater than the first priority. Data is moved from the first superblock to another superblock dedicated for a single zone after the first superblock is closed.

Figure 1:
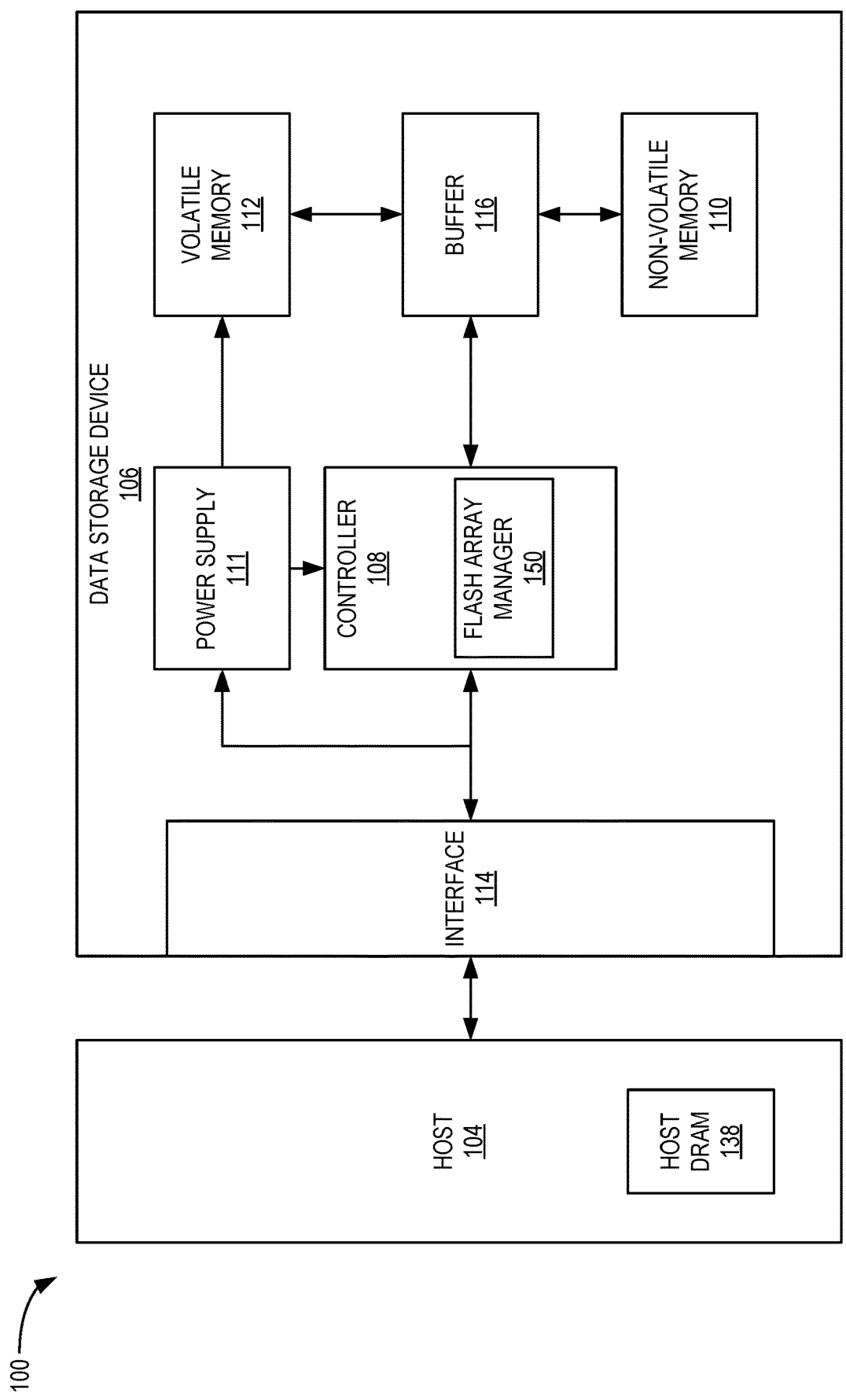
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store the at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Controller 108 includes a flash array manager (FAM) 150, where the FAM 150 is part of a flash translation layer (FTL). In some embodiments, the FTL may be coupled to the controller 108 and the FAM 150 is external to the controller 108 and is included in the FTL. FAM 150 is a module (e.g., component) that deals with bookkeeping and allocation of superblocks (SBs) of the NVM 110 to one or more zones. A SB is a set of blocks, which may be one or more blocks, of each die of a memory device of the NVM 110. It is contemplated that a SB may be formed by selecting one or more blocks from an available set of dies of the memory device, which may be a number of dies up to the total number of dies of the memory device. FAM 150 further maintains a list of a free SBs across the NVM 110. When a zone, as described in FIGS. 2A and 2B, requests a SB, the FAM 150 allocates a SB for the zone. In some examples, the FAM 150 may open and close SBs.

Figure 2A:
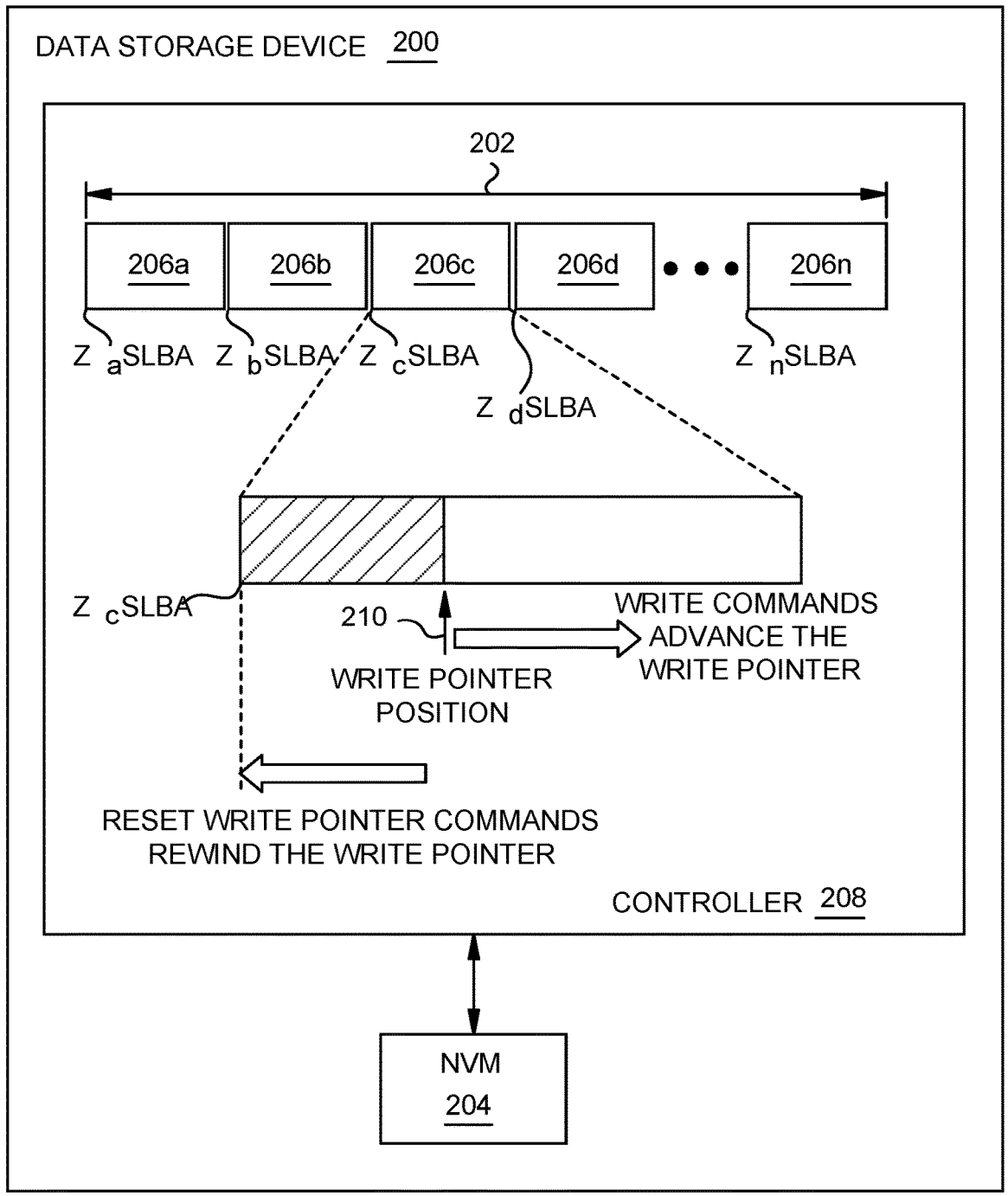
FIG. 2A is an illustration of a zoned namespace utilized in a storage device, according to certain embodiments.

FIG. 2A is an illustration of a Zoned Namespaces (ZNS) 202 view utilized in a data storage device 200, according to certain embodiments. The data storage device 200 may present the ZNS 202 view to a host device, such as the host device 104 of FIG. 1. The data storage device 200 may be the data storage device 106 of the storage system 100 of FIG. 1. The data storage device 200 may have one or more ZNS 202, and each ZNS 202 may be different sizes. The data storage device 200 may further comprise one or more conventional namespaces in addition to the one or more Zoned Namespaces 202. Moreover, the ZNS 202 may be a zoned block command (ZBC) for SAS and/or a zoned-device ATA command set (ZAC) for SATA. Host side zone activity may be more directly related to media activity in zoned drives due to the relationship of logical to physical activity possible.

In the data storage device 200, the ZNS 202 is the quantity of NVM that can be formatted into logical blocks such that the capacity is divided into a plurality of zones 206a-206n (collectively referred to as zones 206). The NVM may be the storage unit or NVM 110 of FIG. 1. Each of the zones 206 comprise a plurality of physical or erase blocks (not shown) of a memory unit or NVM 204, and each of the erase blocks are associated a plurality of logical blocks (not shown). Each of the zones 206 may have a size aligned to the capacity of one or more erase blocks of a NVM or NAND device. When the controller 208 receives a command, such as from a host device (not shown) or the submission queue of a host device, the controller 208 can read data from and write data to the plurality of logical blocks associated with the plurality of erase blocks (EBs) of the ZNS 202. Each of the logical blocks is associated with a unique LBA or sector.

In one embodiment, the NVM 204 is a NAND device. The NAND device comprises one or more dies. Each of the one or more dies comprises one or more planes. Each of the one or more planes comprises one or more erase blocks. Each of the one or more erase blocks comprises one or more wordlines (e.g., 256 wordlines). Each of the one or more wordlines may be addressed in one or more pages. For example, an MLC NAND die may use upper page and lower page to reach the two bits in each cell of the full wordline (e.g., 16 KiB per page). Furthermore, each page can be accessed at a granularity equal to or smaller than the full page. A controller can frequently access NAND in user data granularity logical block address (LBA) sizes of 512 bytes. Thus, as referred to in the below description, NAND locations are equal to a granularity of 512 bytes. As such, an LBA size of 512 bytes and a page size of 16 KiB for two pages of an MLC NAND results in 32 LBAs per wordline. However, the NAND location size is not intended to be limiting, and is merely used as an example.

When data is written to an erase block, one or more logical blocks are correspondingly updated within a zone 206 to track where the data is located within the NVM 204. Data may be written to one zone 206 at a time until a zone 206 is full, or to multiple zones 206 such that multiple zones 206 may be partially full. Similarly, when writing data to a particular zone 206, data may be written to the plurality of erase blocks one block at a time, in sequential order of NAND locations, page-by-page, or wordline-by-wordline, until moving to an adjacent block (i.e., write to a first erase block until the first erase block is full before moving to the second erase block), or to multiple blocks at once, in sequential order of NAND locations, page-by-page, or wordline-by-wordline, to partially fill each block in a parallel fashion (i.e., writing the first NAND location or page of each erase block before writing to the second NAND location or page of each erase block). This sequential programming of every NAND location is a typical non-limiting requirement of many NAND EBs.

When a controller 208 selects the erase blocks that will store the data for each zone, the controller 208 will be able to choose the erase blocks either at the zone open time, or it may choose the erase blocks as it reaches a need to fill the first wordline of that particular erase block. This may be more differentiating when the above described method of filling one erase block completely prior to starting the next erase block is utilized. The controller 208 may use the time difference to select a more optimal erase block in a just-in-time basis. The decision of which erase block is allocated and assigned for each zone and its contiguous LBAs can be occurring for zero or more concurrent zones at all times within the controller 208.

Each of the zones 206 is associated with a zone starting logical block address (ZSLBA) or zone starting sector. The ZSLBA is the first available LBA in the zone 206. For example, the first zone 206a is associated with $Z_a$SLBA, the second zone 206b is associated with $Z_b$SLBA, the third zone 206c is associated with $Z_c$SLBA, the fourth zone 206d is associated with $Z_d$SLBA, and the $n^{th}$ zone 206n (i.e., the last zone) is associated with $Z_n$SLBA. Each zone 206 is identified by its ZSLBA, and is configured to receive sequential writes (i.e., writing data to the NVM 110 in the order the write commands are received).

As data is written to a zone 206, a write pointer 210 is advanced or updated to point to or to indicate the next available block in the zone 206 to write data to in order to track the next write starting point (i.e., the completion point of the prior write equals the starting point of a subsequent write). Thus, the write pointer 210 indicates where the subsequent write to the zone 206 will begin. Subsequent write commands are 'zone append' commands, where the data associated with the subsequent write command appends to the zone 206 at the location the write pointer 210 is indicating as the next starting point. An ordered list of LBAs within the zone 206 may be stored for write ordering. Each zone 206 may have its own write pointer 210. Thus, when a write command is received, a zone is identified by its ZSLBA, and the write pointer 210 determines where the write of the data begins within the identified zone.

Figure 2B:
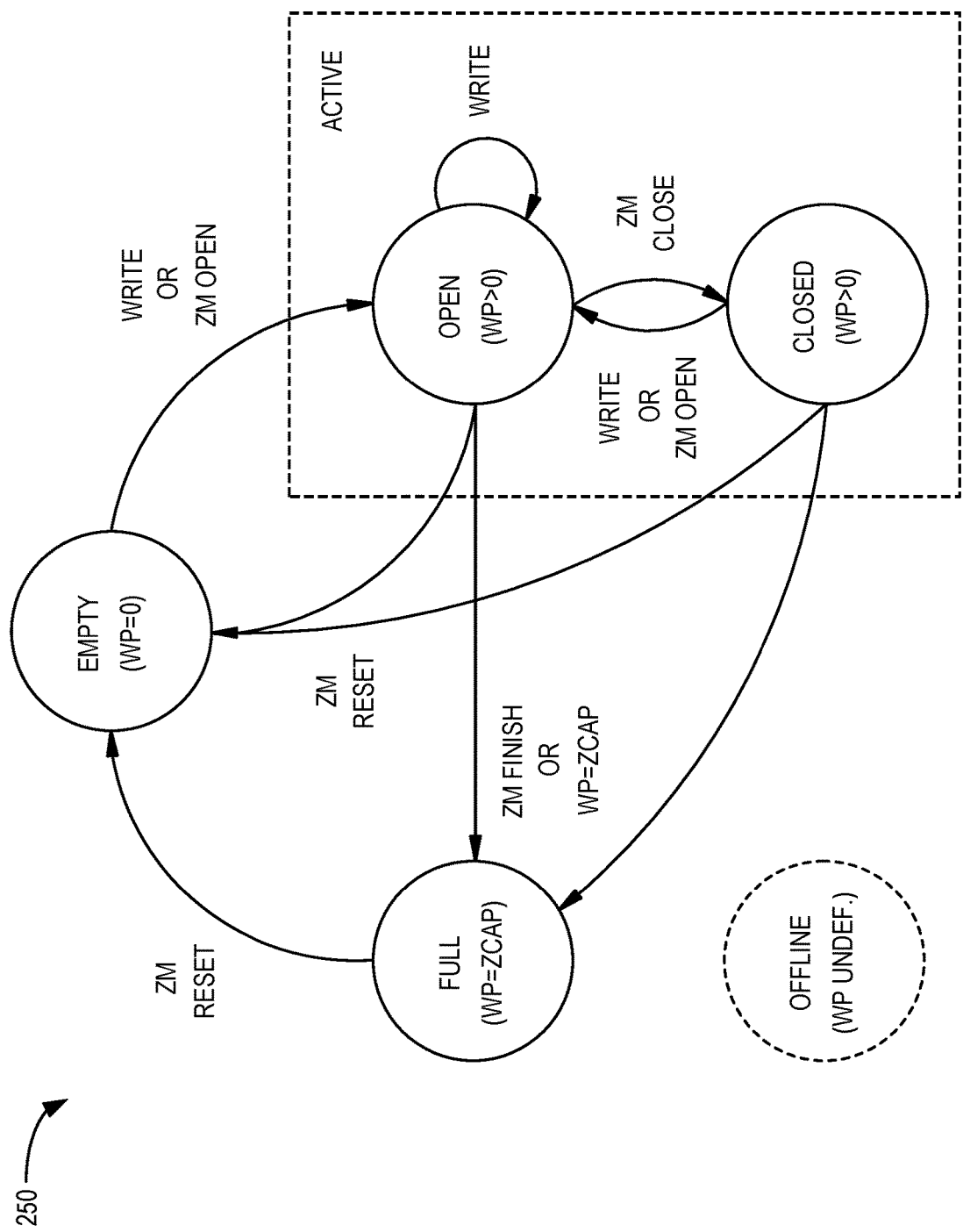
FIG. 2B is an illustration of a state diagram for the zoned namespaces of the storage device of FIG. 2A, according to certain embodiments.

FIG. 2B is an illustration of a state diagram 250 for the ZNS 202 of the data storage device 200 of FIG. 2A, according to certain embodiments. In the state diagram 250, each zone may be in a different state, such as empty, active, full, or offline. When a zone is empty, the zone is free of data (i.e., none of the erase blocks in the zone are currently storing data) and the write pointer is at the ZSLBA (i.e., WP=0). An empty zone switches to an open and active zone once a write is scheduled to the zone or if the zone open command is issued by the host. Zone management (ZM) commands can be used to move a zone between zone open and zone closed states, which are both active states. If a zone is active, the zone comprises open blocks that may be written to, and the host may be provided a description of recommended time in the active state. The controller 208 comprises the ZM. Zone metadata may be stored in the ZM and/or the controller 208.

The term "written to" includes programming user data on 0 or more NAND locations in an erase block and/or partially filled NAND locations in an erase block when user data has not filled all of the available NAND locations. The term "written to" may further include moving a zone to full due to internal drive handling needs (open block data retention concerns because the bits in error accumulate more quickly on open erase blocks), the data storage device 200 closing or filling a zone due to resource constraints, like too many open zones to track or discovered defect state, among others, or a host device closing the zone for concerns such as there being no more data to send the drive, computer shutdown, error handling on the host, limited host resources for tracking, among others.

The active zones may be either open or closed. An open zone is an empty or partially full zone that is ready to be written to and has resources currently allocated. The data received from the host device with a write command or zone append command may be programmed to an open erase block that is not currently filled with prior data. A closed zone is an empty or partially full zone that is not currently receiving writes from the host in an ongoing basis. The movement of a zone from an open state to a closed state allows the controller 208 to reallocate resources to other tasks. These tasks may include, but are not limited to, other zones that are open, other conventional non-zone regions, or other controller needs.

In both the open and closed zones, the write pointer is pointing to a place in the zone somewhere between the ZSLBA and the end of the last LBA of the zone (i.e., WP>0). Active zones may switch between the open and closed states per designation by the ZM, or if a write is scheduled to the zone. Additionally, the ZM may reset an active zone to clear or erase the data stored in the zone such that the zone switches back to an empty zone. Once an active zone is full, the zone switches to the full state. A full zone is one that is completely filled with data, and has no more available sectors or LBAs to write data to (i.e., WP=zone capacity (ZCAP)). In a full zone, the write pointer points to the end of the writeable capacity of the zone. Read commands of data stored in full zones may still be executed.

The zones may have any total capacity, such as 256 MiB or 512 MiB. However, a small portion of each zone may be inaccessible to write data to, but may still be read, such as a portion of each zone storing the parity data and one or more excluded erase blocks. For example, if the total capacity of a zone 206 is 512 MiB, the ZCAP may be 470 MiB, which is the capacity available to write data to, while 42 MiB are unavailable to write data. The writeable capacity (ZCAP) of a zone is equal to or less than the total zone storage capacity. The data storage device 200 may determine the ZCAP of each zone upon zone reset. For example, the controller 208 or the ZM may determine the ZCAP of each zone. The data storage device 200 may determine the ZCAP of a zone when the zone is reset.

The ZM may reset a full zone, scheduling an erasure of the data stored in the zone such that the zone switches back to an empty zone. When a full zone is reset, the zone may not be immediately cleared of data, though the zone may be marked as an empty zone ready to be written to. However, the reset zone must be erased prior to switching to an open and active zone. A zone may be erased any time between a ZM reset and a ZM open. Upon resetting a zone, the data storage device 200 may determine a new ZCAP of the reset zone and update the Writeable ZCAP attribute in the zone metadata. An offline zone is a zone that is unavailable to write data to. An offline zone may be in the full state, the empty state, or in a partially full state without being active.

Since resetting a zone clears or schedules an erasure of all data stored in the zone, the need for garbage collection of individual erase blocks is eliminated, improving the overall garbage collection process of the data storage device 200. The data storage device 200 may mark one or more erase blocks for erasure. When a new zone is going to be formed and the data storage device 200 anticipates a ZM open, the one or more erase blocks marked for erasure may then be erased. The data storage device 200 may further decide and create the physical backing of the zone upon erase of the erase blocks. Thus, once the new zone is opened and erase blocks are being selected to form the zone, the erase blocks will have been erased. Moreover, each time a zone is reset, a new order for the LBAs and the write pointer 210 for the zone 206 may be selected, enabling the zone 206 to be tolerant to receive commands out of sequential order. The write pointer 210 may optionally be turned off such that a command may be written to whatever starting LBA is indicated for the command.

Referring back to FIG. 2A, when the host device 104 sends a write command to write data to a zone 206, the controller 208 pulls-in the write command and identifies the write command as a write to a newly opened zone 206. The controller 208 selects a set of EBs to store the data associated with the write commands of the newly opened zone 206 to, and the newly opened zone 206 switches to an active zone 206. The write command may be a command to write new data, or a command to move valid data to another zone for garbage collection purposes. The controller 208 is configured to DMA read new commands from a submission queue populated by a host device.

In an empty zone 206 just switched to an active zone 206, the data is assigned to the zone 206 and the associated set of sequential LBAs of the zone 206 starting at the ZSLBA, as the write pointer 210 is indicating the logical block associated with the ZSLBA as the first available logical block. The data may be written to one or more erase blocks or NAND locations that have been allocated for the physical location of the zone 206. After the data associated with the write command has been written to the zone 206, a write pointer 210 is updated to point to the next LBA available for a host write (i.e., the completion point of the first write). The write data from this host write command is programmed sequentially into the next available NAND location in the erase block selected for physical backing of the zone.

For example, the controller 208 may receive a first write command to a third zone 206c, or a first zone append command. The host device 104 identifies sequentially which logical block of the zone 206 to write the data associated with the first command to. The data associated with the first command is then written to the first or next available LBA(s) in the third zone 206c as indicated by the write pointer 210, and the write pointer 210 is advanced or updated to point to the next available LBA available for a host write (i.e., WP>0). If the controller 208 receives a second write command to the third zone 206c, or a second zone append command, the data associated with the second write command is written to the next available LBA(s) in the third zone 206c identified by the write pointer 210. Once the data associated with the second command is written to the third zone 206c, the write pointer 210 once again advances or updates to point to the next available LBA available for a host write. Resetting the third zone 206c moves the write pointer 210 back to the $Z_c$SLBA (i.e., WP=0), and the third zone 206c switches to an empty zone.

In the description herein, the term "erase block" may be referred to as "block" for simplification purposes.

Figure 3:
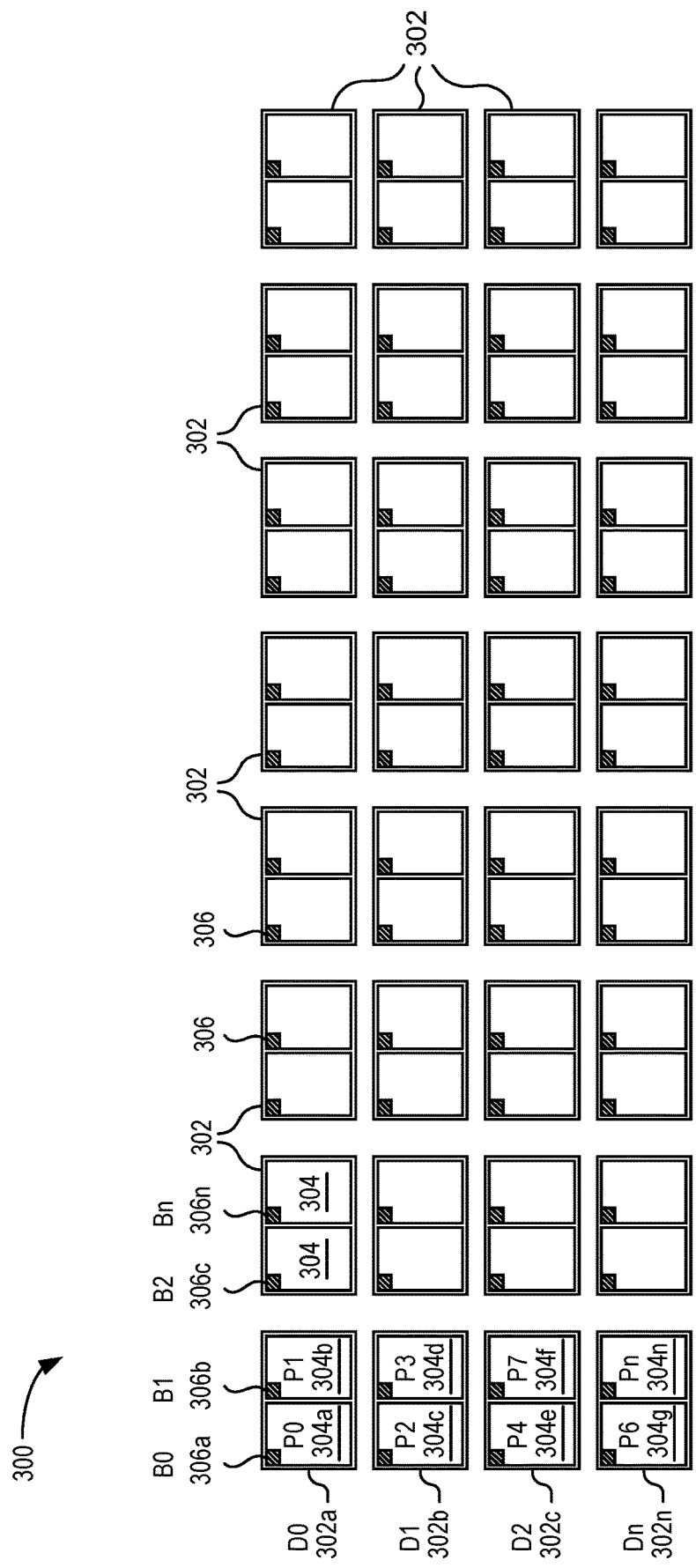
FIG. 3 is an illustration of a superblock of a memory device, according to certain embodiments.

FIG. 3 is an illustration of a superblock of a memory device 300, according to certain embodiments. The memory device 300 includes a plurality of dies 302a-302n, collectively referred to as dies 302, where each die of the plurality of dies 302a-302n includes a first plane 304a and a second plane 304b, collectively referred to as planes 304. Each of the planes 304 includes a plurality of blocks 306a-306n, collectively referred to as block 306. While 32 dies 302 are shown in the memory device 300, any number of dies may be included.

A superblock includes a block 306 from each plane 304 of each die 302. In some examples, a superblock may include one or more blocks 306 from each plane 304 of each die 302. For example, each of the blocks 306 shaded in the memory device 300 may collectively be a superblock. Furthermore, in some embodiments, one or more dies 302 of the memory device 300 may be provisioned for storing XOR or parity data. In the description herein, a SB has the same capacity as a zone and may be referred to interchangeably, for exemplary purposes. For example, a capacity of the SB is equal to ZCAP.

Furthermore, data is written sequentially from block to block in a first zone so that data is written to B0 306a before data is written to B1 306b. Data is also written sequentially from zone to zone so that data is written from a first zone before data is written to a second zone. A zone may have any writeable capacity (ZCAP), such as 256 MiB or 512 MiB, as discussed above. Each zone of a plurality of zones may have the same zone capacity. Data is erased in the zone capacity size when a data storage device, such as the data storage device 106 of FIG. 1, receives a zone reset request (or in some cases, generates a zone reset request as part of a data management operation, such as garbage collection). In other words, individual blocks cannot be erased unless an entire zone is erased or moved to the Zone Empty state (i.e., zone empty), as described in FIG. 2B. However, if the data storage device 106 comprises a non-volatile memory that has partial capability of ZNS, data is erased from the data storage device 106 in the zone capacity size in the portion of the non-volatile memory that has ZNS capability. Data may be erased from a non-ZNS capable non-volatile storage unit in a block size.

Furthermore, the location of the data stored in a ZNS-enabled portion of the NVM, such as the NVM 110 of FIG. 1, is recorded in a first logical to physical (L2P) table as LBAs in a volatile memory unit, such as the volatile memory 112. The location of the data stored in a non-ZNS-enabled portion of the NVM, such as the NVM 110 of FIG. 1, is recorded in a second L2P table as LBAs in a volatile memory unit, such as the volatile memory 112. The volatile memory 112 may be a DRAM unit. Furthermore, the NVM 110 may include a first L2P table that matches the first L2P table of the volatile memory 112 and a second L2P table that matches the second L2P table of the volatile memory 112. The L2P tables in the NVM 110 are updated to match the L2P tables of the volatile memory 112.

The L2P tables include pointers that point to each physical location of the data within the NVM 110. The physical location of the data is mapped in a logical array, such that the pointer address array comprises the location mapped from die to NAND location. In a block, the total number of pointers is calculated as follows: 256 WL*3 Pages/WL*4 Slots/Page*1 pointer/slot=3,072 pointers. Within a first zone at capacity comprising 62 blocks, 190,464 pointers may exist (i.e., 3,072 pointers/block*62 blocks=190,464 pointers). Each pointer comprises a certain amount of data that utilizes the available storage of the volatile memory 112 and/or the NVM 110.

Figure 4:
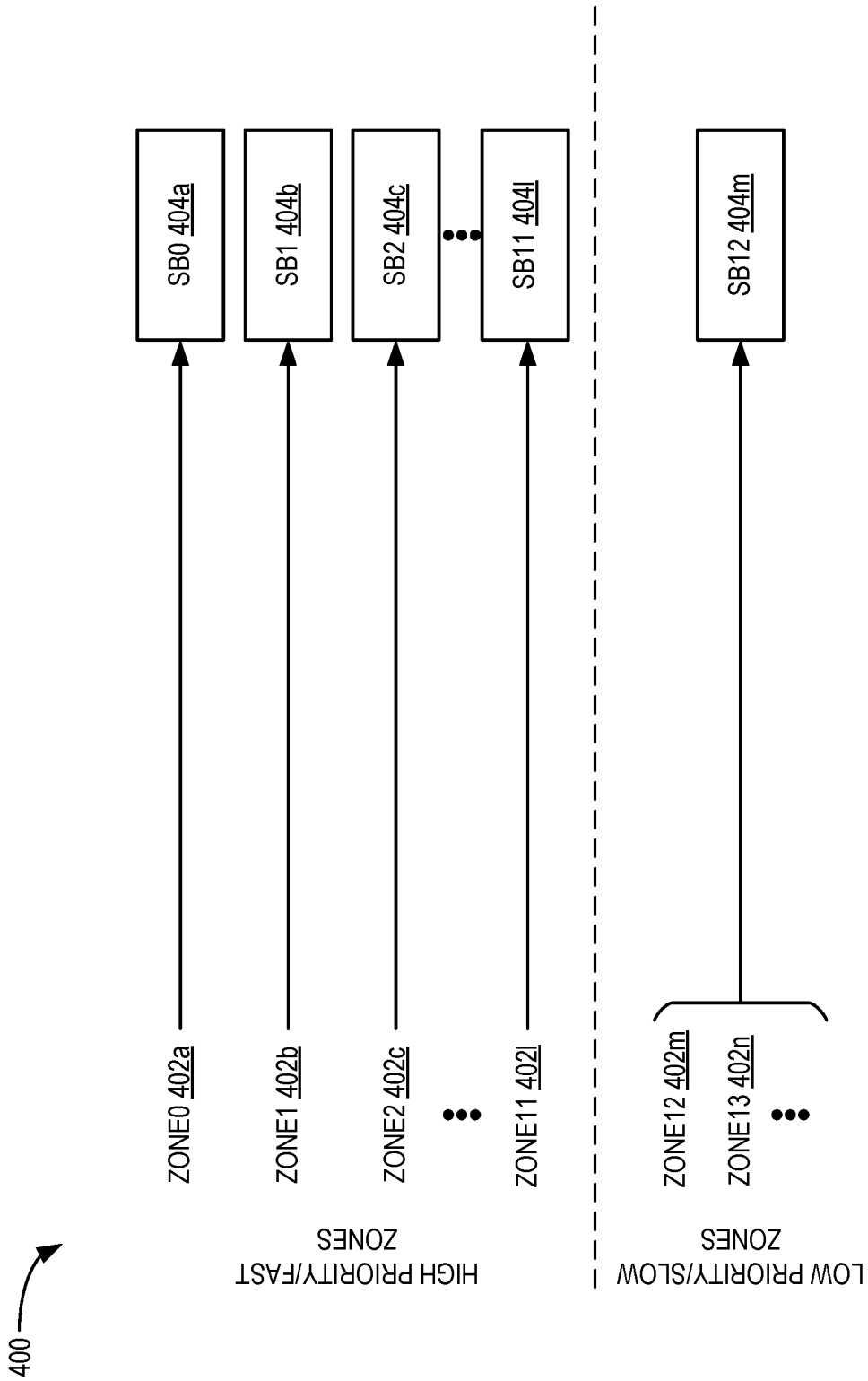
FIG. 4 is an illustration of allocating one or more zones of a plurality of zones to a superblock of a plurality of superblocks, according to certain embodiments.

FIG. 4 is an illustration of allocating one or more zones of a plurality of zones 402a-402n to a superblock of a plurality of SBs 404a-404m, according to certain embodiments. Aspects of the storage system 100 of FIG. 1 may be referenced herein for exemplary purposes. For example, the plurality of SBs 404a-404m are sets of blocks formed from the dies of the NVM 110.

When the host device 104 requests a zone to be opened or allocated, either implicitly (e.g., an implicit zone open mode) or explicitly (e.g., an explicit zone open mode), the FAM 150 determines a SB to allocate to the zone. An implicit request may be a request from the host device 104 that does not include a zone open command, but rather includes an input/output command (e.g., a write command) for the zone. The implicit request may be for zones that have lesser data throughput, such as those that have little to no heavy traffic or write throughput. An explicit request may be a request from the host device 104 that includes a zone open command. The explicit request may be for zones that have a higher data throughput than zones allocated for an implicit request. Thus, an implicit request may have a first priority level and an explicit request may have a second priority level, where the second priority level is a greater priority than the first priority level.

In one example, the FAM 150 may allocate a common SB or a dedicated SB of the plurality of SBs based on the type of request received from the host device 104. For example, when the host device 104 sends an explicit request to open a zone, the FAM 150 allocates a dedicated SB to the zone. The dedicated SB stores data associated with the zone. Zone0 402a through zone11 402l are each allocated to a respective SB (i.e., SB0 404a through SB11 404l). When the host device 104 sends an implicit request to open a zone, the FAM 150 allocates a common SB to the zone. The common SB stores data of one or more zones. For example, zone12 402m and zone13 402n are stored in SB12 404m.

In another example, the FAM 150 may allocate dedicated SBs for each received request, implicit or explicit, up to a maximum number of dedicated SBs. When the maximum number of dedicated SBs are allocated, the FAM 150 allocates a common SB to the received requests, implicit or explicit, until an allocated dedicated SB is closed, thus freeing a dedicated SB to be allocated.

When a common SB, such as the SB12 404m, becomes full, the common SB is closed and a new common SB is opened when another implicit request (or an explicit request when there are no more dedicated SBs available to be allocated) is received. Furthermore, it is to be understood that more than one common SBs may be open concurrently. The controller 108 collects/selectively picks data of a zone of the closed common SB and stores the data in a separate SB in the background (e.g., when the data storage device 106 is idle), so that the separate SB stores data of a single zone. The separate SB is a dedicated SB, which may be the same as the dedicated SBs allocated for explicit requests. The separating of data of the closed common SB may be completed through zone garbage collection. Furthermore, it is to be understood that more than one common SBs may be open concurrently.

Figure 5:
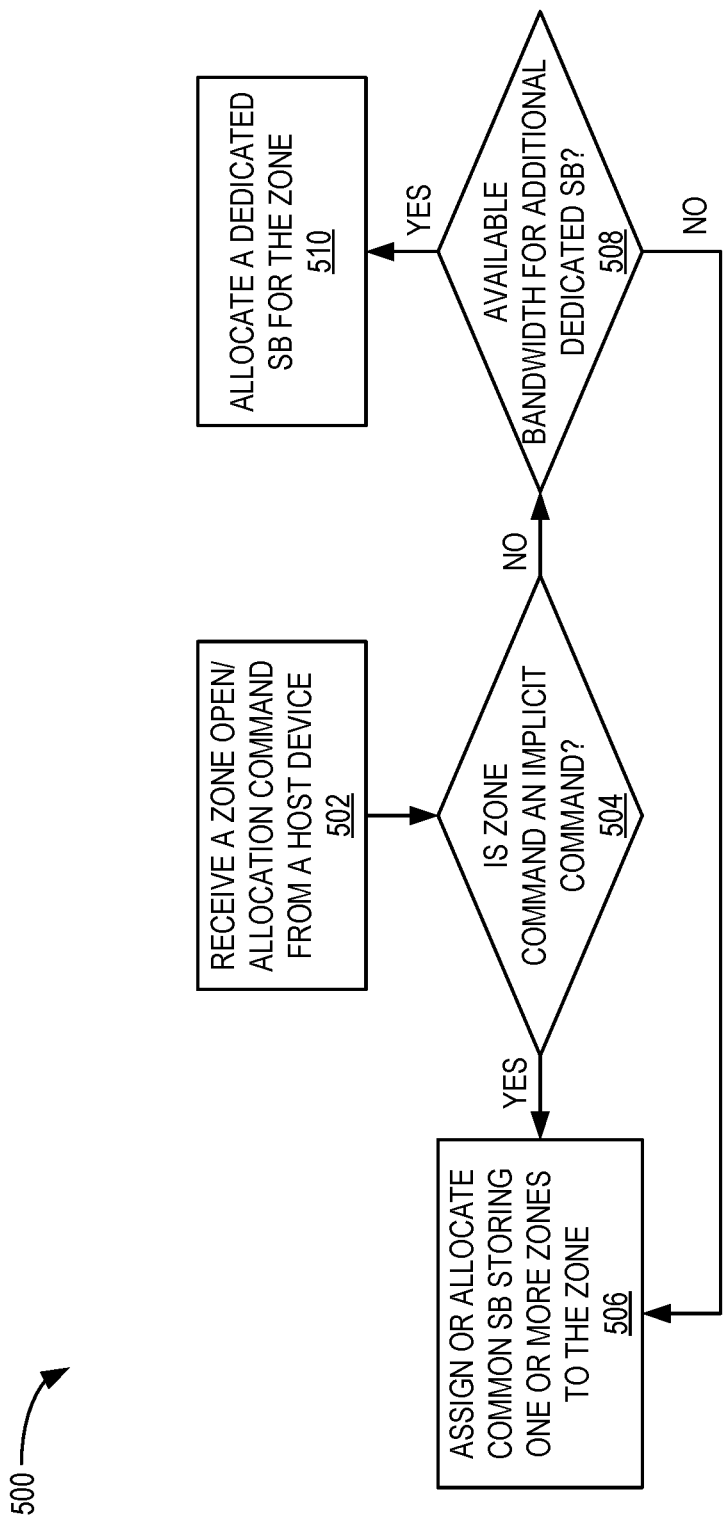
FIG. 5 is a flow diagram illustrating a method of allocating a superblock to one or more zones, according to certain embodiments.

FIG. 5 is a flow diagram illustrating a method 500 of allocating a superblock to one or more zones, according to certain embodiments. Method 500 may be implemented by the controller 108 of FIG. 1 and aspects of the storage system 100 may be referenced herein for exemplary purposes. For example, the FAM 150 may allocate SBs to a respective one or more zones.

At block 502, the controller 108 receives a zone open/allocation command from the host device 104. At block 504, the controller 108 determines if the received zone command is an implicit command. For example, if the received command from the host device 104 does not include a zone open command, then the received zone command is an implicit command. If the received zone command is an implicit command at block 504, then the controller 108 assigns or allocates a common SB that is configured to store one or more zones to the zone associated with the received zone command at block 506.

However, if the received zone command is not an implicit command (i.e., the received zone command is an explicit command), at block 504, then the controller 108 assigns or allocates determines if there is available bandwidth for an additional dedicated SB at block 508. For example, if the data storage device 106 can support up to 12 open and active dedicated SBs and 1 open and active common SB concurrently, then the controller determines if opening or allocating an additional dedicated SB will cause the data storage device to exceed the 12 open and active dedicated SB limit. If the data storage device 106 does not have enough bandwidth for an additional dedicated SB at block 508, then the controller 108 assigns or allocates a common SB that is configured to store one or more zones to the zone associated with the received zone command at block 506. However, if the data storage device 106 does have enough bandwidth for an additional dedicated SB at block 508, then the controller 108 allocates a dedicated SB for the zone associated with the zone command.

Figure 6:
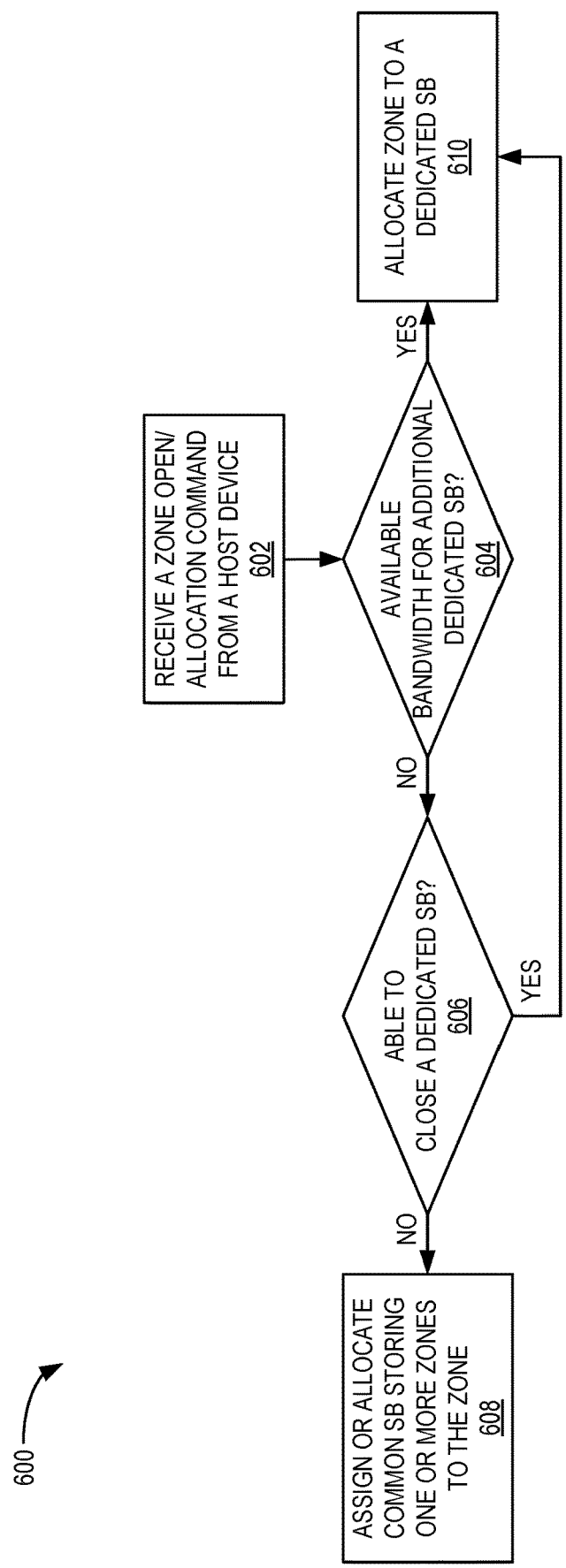
FIG. 6 is a flow diagram illustrating a method of allocating a superblock to one or more zones, according to certain embodiments.

FIG. 6 is a flow diagram illustrating a method 600 of allocating a superblock to one or more zones, according to certain embodiments. Method 600 may be implemented by the controller 108 of FIG. 1 and aspects of the storage system 100 may be referenced herein for exemplary purposes. For example, the FAM 150 may allocate SBs to a respective one or more zones.

At block 602, the controller 108 receives a zone open/allocation command from the host device 104. At block 604, the controller 108 determines if there is available bandwidth for an additional dedicated SB. For example, if the data storage device 106 can support up to 12 open and active dedicated SBs and 1 open and active common SB concurrently, then the controller determines if opening or allocating an additional dedicated SB will cause the data storage device to exceed the 12 open and active dedicated SB limit. In one example, the controller 108 may not take into account whether the received zone command is an explicit command or an implicit command. Rather, the controller 108 may allocate a dedicated SB for each of the first 12 zone commands (or additional commands, if one of the first 12 zones is closed) regardless of whether the received zone command is an explicit command or an implicit command. Additional zone commands that cause the data storage device 106 to exceed the available bandwidth for dedicated SBs are allocated to a common SB regardless of whether the received zone command is an explicit command or an implicit command.

If the data storage device 106 cannot support an additional dedicated SB, such that there is not available bandwidth to do so, at block 604, then the controller 108 determines if one of the open and active dedicated SBs may be closed at block 606. For example, the determination may be based on a fullness of the dedicated SB, a time since a last write to the dedicated SB, a data throughput of the dedicated SB, and the like. It is to be understood that a combination of the previously mentioned factors may be utilized in the determination. In one example, a first dedicated SB that is fuller than a second dedicated SB may be chosen to be closed. In another example, a first dedicated SB that has longer elapsed time since the last write than a second dedicated SB may be chosen to be closed. In yet another example, a first dedicated SB that has a lower data throughput than a second dedicated SB may be chosen to be closed. It is to be understood that a combination of the previously described examples may be utilized in the determination of whether to close a dedicated SB at block 606.

If the controller is not able to close a dedicated SB at block 606, then the controller assigns or allocates a common SB that is configured to store one or more zones to the zone associated with the received zone command at block 608. If the controller is able to close a dedicated SB at block 606 or if there is available bandwidth for an additional dedicated SB at block 604, then a dedicated SB is allocated to the zone associated with the received zone command at block 610.

Figure 7:
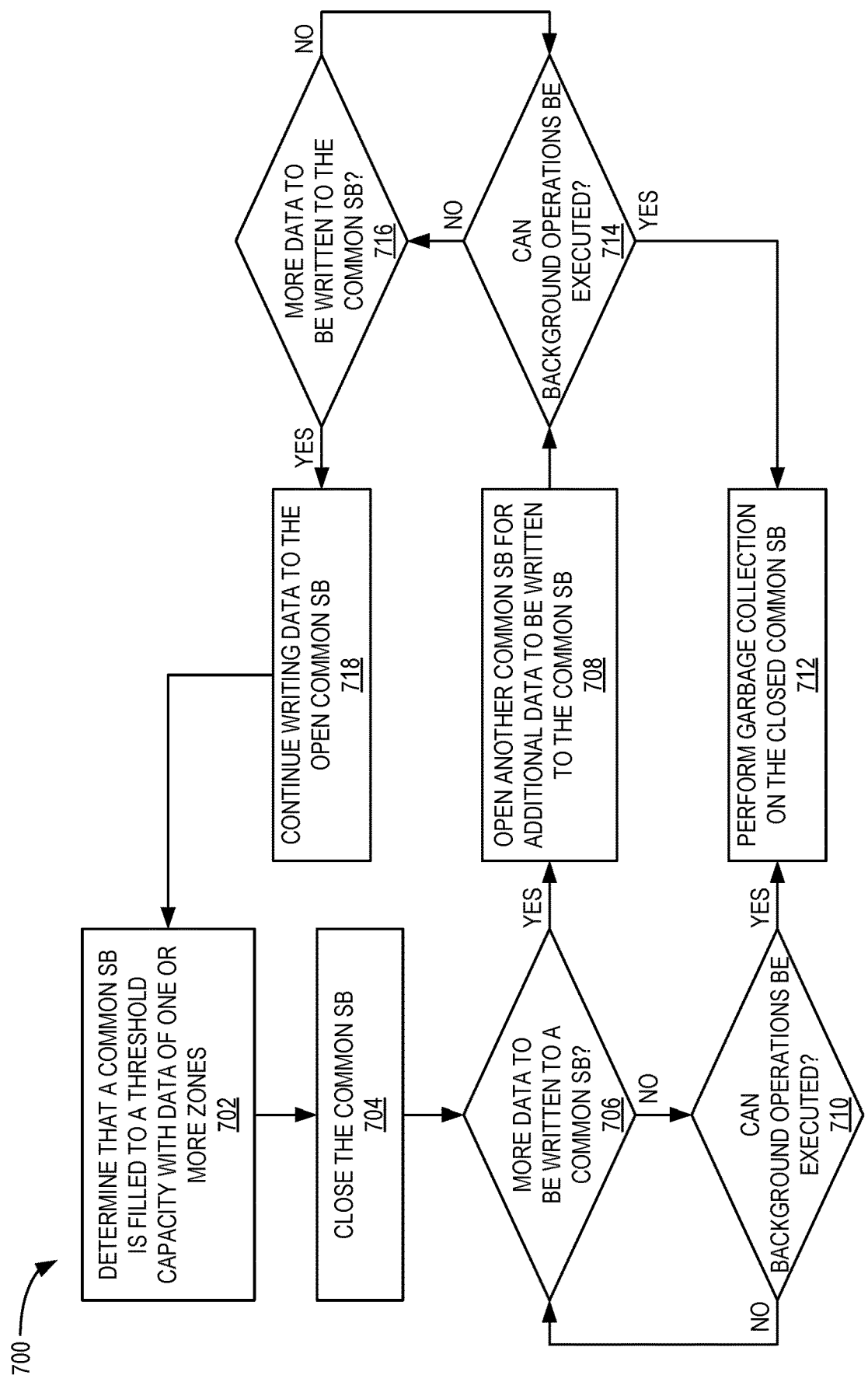
FIG. 7 is a flow diagram illustrating a method of separating zone data of a common superblock, according to certain embodiments To facilitate understanding, identical reference numerals have been used, where possible, to designate identical elements that are common to the figures. It is contemplated that elements disclosed in one embodiment may be beneficially utilized on other embodiments without specific recitation.

FIG. 7 is a flow diagram illustrating a method 700 of separating zone data of a common superblock, according to certain embodiments. Method 700 may be implemented by the controller 108 of FIG. 1 and aspects of the storage system 100 may be referenced herein for exemplary purposes. For example, the FAM 150 may allocate SBs to a respective one or more zones or schedule garbage collection operations to the NVM 110.

At block 702, the controller 108 determines that a common SB is filled to a threshold capacity with data of one or more zones. The threshold capacity may be the ZCAP described in FIG. 2B above. Furthermore, the threshold capacity may also be an adjustable threshold capacity based on superblock factors, such as a time that the common SB has been open, a number of writes to the common SB, a program erase count of the common SB, and the like. It is to be understood that a combination of the previously mentioned factors is also contemplated. At block 704, the controller 108 closes the common SB in response to the determining at block 702. At block 706, the controller 108 determines if there is more data to be written to a common SB, such as the remaining data of a write command that was partially written to the closed common SB or an additional write command that has not yet been written to a common SB.

If there is not more data to be written to a common SB at block 706, then the controller 108 determines if background operations can be executed at block 710, such as when the data storage device 106 is idle or when system resources are not being used for one or more of the allotted dedicated SBs. Background operations may include zone garbage collection operations, where a zone garbage collection operation is a process of collecting specific zone data from a common SB and writing the collected zone data to a dedicated SB for that zone. If background operations cannot be executed at block 710, then method 700 returns to block 706. However, if background operations can be executed at block 710, then the controller 108 performs garbage collection on the closed common SB and moves data of each zone to a dedicated SB for the respective zone at block 712.

If there is more data to be written to a common SB at block 706, then the controller opens another common SB for the additional data to be written to the opened common SB at block 708. At block 714, the controller 108 determines if background operations can be executed at block 710, such as when the data storage device 106 is idle or when system resources are not being used for one or more of the allotted dedicated SBs. If background operations can be executed at block 714, then the controller 108 performs garbage collection on the closed common SB and moves data of each zone to a dedicated SB for the respective zone at block 712. If background operations cannot be executed at block 714, then the controller 108 determines if there is more data to be written to a common SB at block 718. At block 718, the controller 108 continues writing data to the open common SB. Method 700 returns to block 702. However, if there is not more data to be written to the common SB at block 716, then method 700 returns to block 714.

By writing data of more than one zone to a common superblock, a higher number of active zones may be achieved without increasing system resources and a higher write performance for dedicated superblocks may be achieved by allocating dedicated resources.

In one embodiment, a data storage device includes a memory device having a plurality of superblocks and a controller coupled to the memory device. The controller is configured to allocate two or more zones to a first superblock of the plurality of superblocks.

The controller includes a second superblock. The second superblock consists of data of a single zone. The first superblock has a first priority and the second superblock has a second priority. The first priority is a lower priority than the second priority. The first priority corresponds to an implicit zone open mode. The second priority corresponds to an explicit zone open mode. The first priority corresponds to a first data throughput. The second priority corresponds to a second data throughput. The second data throughput is higher than the first data throughput. The controller is further configured to move data of a first zone of the two or more zones to a third superblock. The first zone is a closed zone when the data is moved. The moving of data is occurring during garbage collection.

In another embodiment, a data storage device includes a memory device having a plurality of superblocks and a controller coupled to the memory device. The controller is configured to receive a first command to open a first zone or allocate first data to the first zone, allocate a first superblock of the plurality of superblocks to the first zone, the first superblock configured to store data of more than one zone, receive a second command to open a second zone or allocate second data to the second zone, and either allocate the first superblock to the second zone or allocate a second superblock to the second zone. The second superblock consists of a single zone.

The controller is further configured to determine a priority of the first zone. The priority is either a first priority level or a second priority level. The first priority level is lower than the second priority level. The controller is further configured to determine the priority of the second zone. The controller is further configured to allocate the first superblock to the second zone when the second zone has the first priority level. The controller is further configured to allocate the second superblock to the second zone when the second zone has the second priority level.

In another embodiment, a data storage device includes memory means having a plurality of superblocks and a controller coupled to the memory means. The controller is configured to allocate a first one or more superblocks to store one zone per superblock and allocate a second one or more superblocks to store more than one zone per superblock.

The controller is further configured to determine a threshold number of the first one or more superblocks. The controller is further configured to allocate the second one or more superblocks to received zone open commands when the threshold number of the first one or more superblocks is reached or exceeded. The controller is further configured perform garbage collection on the second one or more superblocks. The garbage collection includes moving data of a single zone to a newly allocated superblock different from the first one or more super blocks and the second one or more superblocks.

What is claimed is:

1. A data storage device, comprising:
a memory device having a plurality of superblocks and a plurality of dies, wherein:
each of the plurality of dies comprises a plurality of blocks; and
each superblock of the plurality of superblocks comprises at least one block of the plurality of blocks from each of the plurality of dies of the memory device; and
a controller coupled to the memory device, the controller configured to:
allocate two or more zones to a first superblock of the plurality of superblocks, wherein a zone is distinct from a superblock, and wherein the zone is either explicitly opened or implicitly opened by a host device through a command received from the host device, wherein implicitly opened is in response to an implicit request from the host device that does not include a zone open command, and wherein explicitly opened is in response to a request from the host device that includes a zone open command.

2. The data storage device of claim 1, wherein the controller comprises a second superblock, and wherein the second superblock consists of data of a single zone.

3. The data storage device of claim 2, wherein the first superblock has a first priority and the second superblock has a second priority, and wherein the first priority is a lower priority than the second priority.

4. The data storage device of claim 3, wherein the first priority corresponds to an implicit zone open mode.

5. The data storage device of claim 3, wherein the second priority corresponds to an explicit zone open mode.

6. The data storage device of claim 3, wherein the first priority corresponds to a first data throughput.

7. The data storage device of claim 6, wherein the second priority corresponds to a second data throughput, and wherein the second data throughput is higher than the first data throughput.

8. The data storage device of claim 1, wherein the controller is further configured to move data of a first zone of the two or more zones to a third superblock.

9. The data storage device of claim 8, wherein the first zone is a closed zone when the data is moved.

10. The data storage device of claim 8, wherein the moving of data is occurring during garbage collection.

11. A data storage device, comprising:
a memory device having a plurality of superblocks and a plurality of dies, wherein:
each of the plurality of dies comprises a plurality of blocks; and
each superblock of the plurality of superblocks comprises at least one block of the plurality of blocks from each of the plurality of dies of the memory device; and
a controller coupled to the memory device, the controller configured to:
receive a first command to open a first zone or allocate first data to the first zone;
allocate a first superblock of the plurality of superblocks to the first zone, the first superblock configured to store data of more than one zone, wherein a zone is distinct from a superblock, and wherein the zone is either explicitly opened or implicitly opened by a host device through a command received from the host device, wherein implicitly opened is in response to an implicit request from the host device that does not include a zone open command, and wherein explicitly opened is in response to a request from the host device that includes a zone open command;
receive a second command to open a second zone or allocate second data to the second zone; and
allocate the first superblock to the second zone.

12. The data storage device of claim 11, wherein the controller is further configured to determine a priority of the first zone, wherein the priority is either a first priority level or a second priority level, and wherein the first priority level is lower than the second priority level.

13. The data storage device of claim 12, wherein the controller is further configured to determine the priority of the second zone.

14. The data storage device of claim 13, wherein the controller is further configured to allocate the first superblock to the second zone when the second zone has the first priority level.

15. The data storage device of claim 13, wherein the controller is further configured to allocate a second superblock to the second zone when the second zone has the second priority level, and wherein the second superblock consists of a single zone.

16. A data storage device, comprising:
memory means having a plurality of superblocks and a plurality of dies, wherein:
each of the plurality of dies comprises a plurality of blocks; and
each superblock of the plurality of superblocks comprises at least one block of the plurality of blocks from each of the plurality of dies of the memory means; and
a controller coupled to the memory means, the controller configured to:
allocate a first one or more superblocks to store one zone per superblock, wherein a zone is distinct from a superblock, and wherein the zone is either explicitly or implicitly opened by a host device through a command received from the host device, wherein implicitly opened is in response to an implicit request from the host device that does not include a zone open command, and wherein explicitly opened is in response to a request from the host device that includes a zone open command; and
allocate a second one or more superblocks to store more than one zone per superblock.

17. The data storage device of claim 16, wherein the controller is further configured to determine a threshold number of the first one or more superblocks.

18. The data storage device of claim 17, wherein the controller is further configured to allocate the second one or more superblocks to received zone open commands when the threshold number of the first one or more superblocks is reached or exceeded.

19. The data storage device of claim 16, wherein the controller is further configured perform garbage collection on the second one or more superblocks.

20. The data storage device of claim 19, wherein the garbage collection comprises moving data of a single zone to a newly allocated superblock different from the first one or more superblocks and the second one or more superblocks.

\* \* \* \* \*